United States Patent [19]

Neefe

[11] Patent Number: 4,554,115
[45] Date of Patent: Nov. 19, 1985

[54] METHOD OF CONTROLLING THE CONVEX CURVE OF SOFT LENSES

[76] Inventor: Charles W. Neefe, P.O. Box 429, 811 Scurry St., Big Spring, Tex. 79720

[21] Appl. No.: 628,157

[22] Filed: Jul. 5, 1984

Related U.S. Application Data

[63] Continuation-in-part of Ser. No. 527,757, Aug. 30, 1983, abandoned.

[51] Int. Cl.⁴ .............................................. B29D 11/00
[52] U.S. Cl. ...................................... 264/1.1; 425/808
[58] Field of Search .................. 527/757; 264/1.1, 2.6, 264/2.5, 2.1; 351/160 H

[56] References Cited

U.S. PATENT DOCUMENTS 3,641,717  2/1972  Neefe ................................... 264/1.1
3,778,937  11/1971 Neefe ................................... 351/177
4,084,890  4/1978  Baron .............................. 351/160 H

OTHER PUBLICATIONS

"Some Remarks on the Correction of Astigmatic Eyes by Means of Soft Contact Lenses", Contacto, Nov. 1975, pp. 4–8, Heinz Baron.
Am. J. Optom. & Physiol. Optics, pp. 750–757, vol. 51, Oct.'74, "Clinical Evaluation . . . Residual Astigmatism", Ron Kerns.
"Fitting Information", p. 5, Allan Isen.

Primary Examiner—J. Howard Flint, Jr.

[57] ABSTRACT

A method of controlling the peripheral flattening of the convex aspheric surface on soft contact lenses by providing a soft lens having a spherical convex surface and aspheric concave surface. The concave aspheric surface having a longer radius at the center and progressive shorter radii toward the edge. When this lens is in place on the eye, the convex spherical surface becomes an aspheric surface having a shorter radius at the center and progressively longer radii toward the edge.

11 Claims, 3 Drawing Figures

METHOD OF CONTROLLING THE CONVEX CURVE OF SOFT LENSES

This application is a continuation-in-part of application Ser. No. 527,757, filed Aug. 30, 1983, and now abandoned, entitled, "A METHOD OF MAKING ASPHERIC SOFT LENSES."

Aspheric surfaces have many desirable uses in all types of optical lenses. Their extensive uses have been limited by the difficulty in producing them in quantity and economically. The object of the present invention is to provide a reliable and economical method of producing large numbers of quality aspheric surfaces. A sphere is a poor refracting surface due to spherical aberration. Spherical aberration is the inability of all parts of a spherical surface to bring parallel light rays to a point focus. The periphery of a spherical refracting surface has a shorter focal length than the central area. This condition worsens rapidly with the increase of the aperture. Spherical aberration increases by the square of the aperture. This rapid increase limits the effective use of many larger aperture lenses. Coma and astigmatism of oblique incidents are two off axis manifestations of spherical aberration. If the paths of parallel light are traced through many zones of a large aperture spherical surface, each zone will be found to have a different focal length. If these rays are plotted, a geometric figure, the caustic, will result having no point focus. A zone may be found within the caustic where the rays come closest together. This zone is called the circle of least confusion, and will be located nearer the lens than the focus of the central rays.

If the periphery of the convex lens surface is gradually flattened in precisely the correct degree and place, the caustic may be eliminated and a point focus will result. It has been found that a spherical surface may be changed into such a surface if the area near the edge is flattened slightly. The point of greatest departure from a sphere will be located seventy-one percent of the distance from the center to the edge.

The following is from a report entitled: "A Clinical Evaluation of the Merits of the Front Surface Aspheric Contact Lens for Patients Manifesting Residual Astigmatism," Ronald L. Kerns, College of Optometry, University of Houston, Aug. 5, 1971, page 5.

"Based upon the results of our study, it is apparent that the front surface aspheric contact lenses will increase visual acuity in patients manifesting residual astigmatism between 0.50 D and 1.75 D. The amount of increase will depend on the amount of residual astigmatism and the resolving power of the eye but should not depend on the pupil size. Although our sample was small, the statistics do show the value of this front surface aspheric contact lens design since an improvement in visual acuity was obtained in all subjects. Although good centration is needed, lens movement was not found to be a problem."

PRIOR ART

U.S. Pat. Nos. 3,641,717 and 3,778,937 disclose the use of convex aspheric surfaces on contact lenses for the enhancement of visual acuity.

STATE OF THE ART

Soft lenses being flexible conform to the shape of the cornea upon which they are placed. The concave surface of the soft lens assumes the curvature of the convex corneal surface. Any astigmatism or toric shape present on the corneal surface will therefore be transferred to the concave surface of the soft lens and manifested on the convex surface of the soft contact lens. Spherical soft lenses therefore do not correct corneal astigmatism as rigid spherical hard lenses do.

Residual or internal astigmatism is not corrected by either hard or soft contact lenses.

Figure 1:
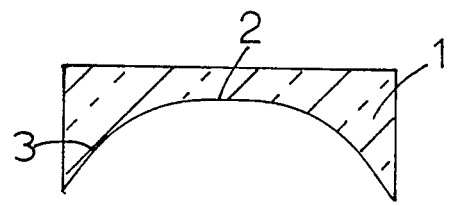
FIG. 1 shows the negative aspheric blank, in section.

THE LENS IS MADE AS FOLLOWS:

The aspheric lens blank 1 FIG. 1 with an aspheric concave curvature having a longer radius 2 FIG. 1 near the center and a progressively shorter radius 3 FIG. 1 toward the edge may be made by injection molding, compression molding or by casting. Injection and compression molding may be used for materials such as polymethylmethacrylate and cellulose acetate butyrate. Other materials such as hydroxyethylmethacrylate (H.E.M.A.) and silicone/acrylate copolymers must be made by casting.

The casting mold is made from a molding resin such as nylon or polyethylene by injection molding. The aspheric optical surface has a convex radius equal to the required concave blank radius.

The mold is filled with the liquid lens monomer covering the optical surface and allowed to polymerize to form a solid monolithic mass. Adhesion between the mold and the polymerized lens material must be great enough to insure that separations of the mold and the lens material does not occur during polymerization. The monomer shrinks in volume when polymerization occurs and adhesion to the mold is necessary to prevent separation. The monomer shrinkage will be from the top and seen as a lessening of the volume present in the mold.

It is possible to cut and polish the aspheric curve having a longer radius 2 FIG. 1 near the center and a shorter radius 3 FIG. 1 near the edge. This is a most difficult operation and requires a high degree of skill and time. Replication is most difficult and impractical in volume production. Molding or casting are much preferred methods.

DEFINING THE ASPHERIC CURVE:

The degree or amount of departure from a sphere of the same overall curvature is greatest at the seventy one percent point and depends upon the diameter of the lens, the radius of curvature, and the refractive index of the lens material. The following formula may be employed to arrive at the maximum depth of the correction required for a plano-convex lens: $x = 0.0123 D/R^3$ x is the departure from a true sphere.

D is the diameter of the lens.

R is the focal - aperture.

The correction at any given distance from the center of the lens may be found by the following formula:
$xy = A/4F^3 (N/N-1)(h^2y^2 - y^4)$.

y is the distance from the center of the lens.

A is the aberration coefficient.

h is the radius of the lens.

F is the focal length.

N is the refractive index.

As a simplified method to determine the aspheric corrected contact lens parameters, a computer was programmed to compile the x and y incremental readings to keep the focal point the same for all off-axis rays. At the same time the spherical radius at each increment was calculated.

In conjunction with the above computer calculations, reciprocal or image calculations were generated to make it possible to fabricate the lens by aspherically correcting the lens concave surface.

Figure 2:
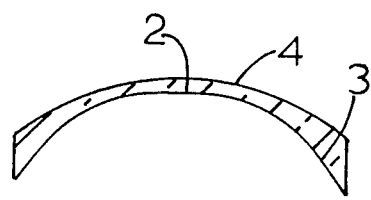
FIG. 2 shows the negative aspheric lens with the aspheric curve on the concave surface in section.
Figure 3:
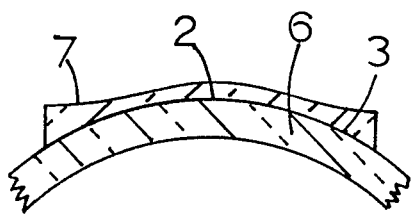
FIG. 3 shows the lens in place on the cornea with the aspheric curve transferred to the convex surface, in section.

THE LENS FUNCTIONS AS FOLLOWS:

A concave negative aspheric curve of the required convex aspheric curve 7 FIG. 3 is provided by molding or casting. The concave aspheric curve will have a longer central radius 2 FIG. 1 progressively changing to a shorter peripheral radius 3 FIG. 1. A spherical convex curve 4 FIG. 2 is cut and polished on the soft lens material in the hard xerogel state. The lens is hydrated to form a soft hydrogel lens having a spherical convex surface and a predetermined aspheric concave surface. The lens is placed on a spherical cornea 6 FIG. 3 allowing the concave negative refractive power aspheric surface to conform and assume the spherical shape of the cornea 6 FIG. 3. The convex lens surface will now have the required positive refractive power aspheric curve 7 FIG. 3. The soft lens central zone 2 FIG. 3 and peripheral zone 3 FIG. 3 will now have the spherical curvature of cornea 6 FIG. 3. The negative aspheric curve present on the concave soft lens surface is now transferred to the convex surface in positive form. The aspheric concave surface having a progressively shorter radius toward the edge will assume the shape of the convex corneal surface. The shorter peripheral concave radius will become a progressively longer convex radius. If this progressive peripheral flattening is controlled to the correct progression and amount to satisfy requirements of the above optical formula, spherical aberration of the eye can be greatly reduced or eliminated. This achievement cannot be accomplished with spectacles. The correction of spherical aberration can be carried out only at the corneal surface, the corneal surface being the prime refractive surface of the eye. The average cornea accounts for +40.00 to +48.00 diopters of the eyes refraction. This method is ideally suited to soft lens production as only four molded concave curvatures are required to fit all eye radii. This is due to the lens ability to conform and fit the cornea on which it is placed.

Various modifications can be made without departing from the spirit of this invention or the scope of the appended claims. The constants set forth in the disclosure are given as examples and are in no way final or binding. In view of the above, it will be seen that the several objects of the invention are obtained. As many changes could be made in the above constructions and methods without departing from the scope of the invention, it is intended that all matter contained in the above description shall be interpreted as illustrative and not in a limiting sense.

I claim:

1. A method of providing a soft contact lens having a preselected aspheric convex surface having a shorter radius of curvature at the center and a progressively longer radii toward the edge when in place on the cornea of the eye and having an aspheric concave surface having a longer radius at the center and progressively shorter radii toward the edge when removed from the eye.

2. A method of controlling the shape of a soft contact lens aspheric convex surface having a shorter convex radius at the center and progressively longer radii toward the lens edge when in place on the cornea of the eye by providing a soft contact lens that when removed from the eye said soft contact lens has a spherical convex surface and an aspheric concave surface having a longer radius at the center and progressively shorter radii toward the lens edge.

3. A method of controlling the aspheric shape of the convex surface of a soft contact lens by providing a spherical convex lens surface and an aspheric concave lens surface having a longer radius of curvature at the lens center and a progressively shorter radii toward the lens edge placing the soft contact lens on the cornea of the eye and allowing the aspheric concave lens surface to assume the curvature of the cornea of the eye and the convex surface of the soft contact lens becoming an aspheric surface having a shorter radius at the center and progressively longer radii toward the lens edge.

4. A method as in claim 1 wherein the convex aspheric surface reduces the spherical aberration of the eye.

5. A method as in claim 2 wherein the convex aspheric surface reduces the spherical aberration of the eye.

6. A method as in claim 3 wherein the convex aspheric surface reduces the spherical aberration of the eye.

7. A method as in claim 1 wherein the soft contact lens is made from a hydrogel material.

8. A method as in claim 2 wherein the soft contact lens is made from a hydrogel material.

9. A method as in claim 3 wherein the soft contact lens is made from a hydrogel material.

10. A method as in claim 1 wherein the soft contact lens has a spherical convex surface when removed from the eye.

11. A method as in claim 1 wherein both convex and concave surfaces are aspherical when the lens is removed from the eye.

* * * * *